United States Patent
Brandt et al.

(10) Patent No.: US 9,468,995 B2
(45) Date of Patent: Oct. 18, 2016

(54) METHOD AND DEVICE FOR JOINT-WELDING COATED METAL SHEETS

(71) Applicant: WISCO Tailored Blanks GmbH, Duisburg (DE)

(72) Inventors: Max Brandt, Duisburg (DE); Arndt Breuer, Duisburg (DE); Robert Vollmer, Graz (AT); Ralf Kolleck, Graz (AT)

(73) Assignee: WISCO Tailored Blanks GmbH, Duisburg (DE)

( * ) Notice: Subject to any disclaimer, the term of this patent is extended or adjusted under 35 U.S.C. 154(b) by 385 days.

(21) Appl. No.: 14/348,382

(22) PCT Filed: Sep. 26, 2012

(86) PCT No.: PCT/EP2012/068969
§ 371 (c)(1),
(2) Date: Mar. 28, 2014

(87) PCT Pub. No.: WO2013/045497
PCT Pub. Date: Apr. 4, 2013

(65) Prior Publication Data
US 2014/0231395 A1   Aug. 21, 2014

(30) Foreign Application Priority Data
Sep. 30, 2011   (DE) .................. 10 2011 114 555

(51) Int. Cl.
*B23K 26/32*   (2014.01)
*B23K 26/24*   (2014.01)
(Continued)

(52) U.S. Cl.
CPC ............. *B23K 26/24* (2013.01); *B23K 26/144* (2015.10); *B23K 26/211* (2015.10); *B23K 26/26* (2013.01); *B23K 26/32* (2013.01); *B23K 26/322* (2013.01);
(Continued)

(58) Field of Classification Search
CPC ....... B23K 26/32; B23K 26/14; B23K 26/24
USPC .............................. 219/74, 137 WM, 121.64
See application file for complete search history.

(56) References Cited

U.S. PATENT DOCUMENTS 3,583,471 A  *  6/1971  Kemming ............ B23K 35/327
                                                                   148/425
4,299,860 A     11/1981  Schaefer et al.
(Continued)

FOREIGN PATENT DOCUMENTS

DE        202007018832 U1    10/2009
EP           0444550 A2       9/1991
(Continued)

Primary Examiner — Samuel M Heinrich
(74) Attorney, Agent, or Firm — The Webb Law Firm

(57) ABSTRACT

A method for joint-welding coated metal sheets in a butt joint. At least one pulverulent welding additive in the form of a gas-powder flow is added to the weld melt via at least one flow duct, such that the gas-powder flow leaving the flow duct is directed towards the weld melt at a speed of at least 2 m/s, such that the welding additive mixes turbulently with the weld melt and flow eddies form in the weld melt. A device including at least one welding head for producing and/or focussing an energy beam and at least one flow duct for supplying gas-powder flow, the flow duct having a longitudinal axis, the longitudinal axis and the beam axis of the energy beam being at an angle between 15 and 75 degrees. The flow duct is adapted to set the gas powder flow to a speed of at least 2 m/s.

9 Claims, 2 Drawing Sheets

Figure 1:
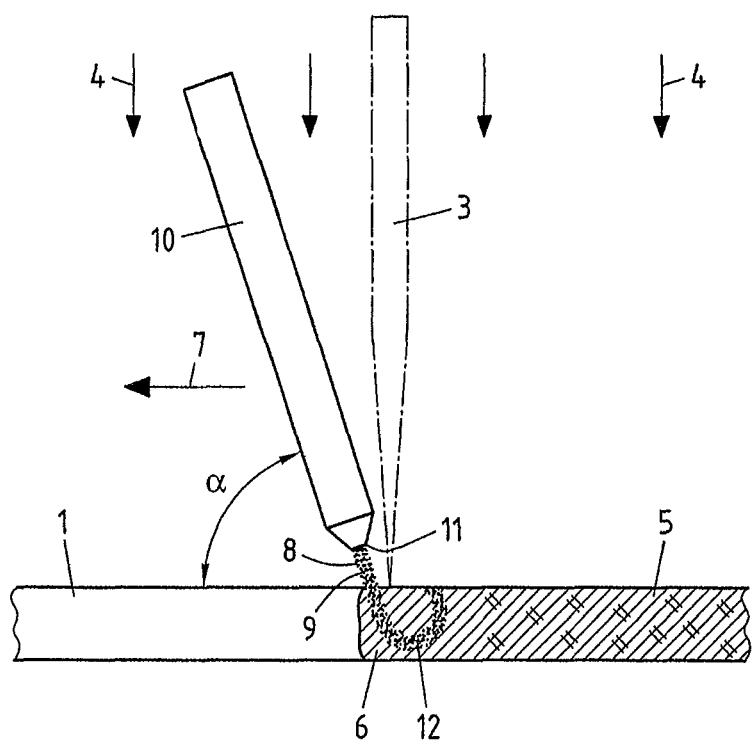

(51) Int. Cl.
*B23K 26/14* (2014.01)
*B23K 26/26* (2014.01)

(52) U.S. Cl.
CPC ........ *B23K 2201/18* (2013.01); *B23K 2201/34* (2013.01); *B23K 2203/50* (2015.10)

(56) References Cited

U.S. PATENT DOCUMENTS

| | | | |
|---|---|---|---|
| 2001/0008230 A1* | 7/2001 | Keicher | B01F 13/0255 219/121.63 |
| 2004/0074882 A1 | 4/2004 | Speranza et al. | |
| 2009/0220815 A1 | 9/2009 | Canourgues et al. | |
| 2012/0074106 A1 | 3/2012 | Canourgues et al. | |

FOREIGN PATENT DOCUMENTS

| | | |
|---|---|---|
| EP | 0780190 A1 | 6/1997 |
| EP | 2022987 A1 | 2/2009 |
| JP | 3234393 A | 10/1991 |
| JP | 716774 A | 1/1995 |
| JP | 741841 A | 2/1995 |
| JP | 81325 A | 1/1996 |
| JP | 8215882 A | 8/1996 |
| JP | 9314337 A | 12/1997 |
| JP | 9314373 A | 12/1997 |
| JP | 2002103072 A | 4/2002 |
| JP | 2008142765 A | 6/2008 |

* cited by examiner

METHOD AND DEVICE FOR JOINT-WELDING COATED METAL SHEETS

CROSS-REFERENCE TO RELATED APPLICATIONS

This application is the United States national phase of International Application No. PCT/EP2012/068969 filed Sep. 26, 2012, and claims priority to German Patent Application No. 10 2011 114 555.2 filed Sep. 30, 2011, the disclosures of which are hereby incorporated in their entirety by reference.

BACKGROUND OF THE INVENTION

1. Field of the Invention

The invention relates to a method and a device for joint-welding coated metal sheets in a butt joint.

2. Description of Related Art

Hot-forming steel components has become well-established in automobile construction in recent years. In this context, many tailored products are manufactured which consist of a plurality of plates of different sheet thicknesses and/or material qualities welded together and which offer high load capacity at relatively low sheet thicknesses and thus a low weight. The plates provided for hot-shaping and press-hardening are generally coated with an organic or inorganic protective layer and/or corrosion protection layer, so as to prevent the workpiece from scaling when hot prior to the hot-forming. In this context, an aluminium alloy is usually used as the coating material, preferably an aluminium-silicon alloy. However, when coated metal sheets of this type are welded, there is often the problem that coating constituents, in particular aluminium, end up in the weld melt and together with iron in the weld seam form Fe-Al compounds, which have a relatively low strength and can weaken the component at the weld seam or even cause the component to fail. Zinc coatings are also possible. In this case, there may be the problem that, during welding, zinc is deposited at the grain boundaries, potentially reducing maximum tensile and compressive stresses in the weld seam.

To solve this problem, what are known as stripping methods have previously been proposed, in which the coating, for example of metal, is removed at the edges of the sheet metal borders to be welded (see for example DE 20 2007 018 823 U1). However, these methods are complex and expensive.

It is further known in the art to add a welding additive to the weld melt so as to improve the strength of the weld seam or of the manufactured component. Thus, for example, JP 07041841 A discloses a laser welding method for joining steel sheets arranged in a butt joint, in which fine carbon powder is added to the weld melt so as to achieve a carbon-enriched weld melt and thus a harder weld seam.

SUMMARY OF THE INVENTION

The object of the present invention is to provide a method and a device with which coated metal sheets can be welded together economically without loss of strength in the weld seam occurring as a result of the addition of primary coating constituents from the protective layer edges of the joined metal sheets.

In the method according to the invention, at least one pulverulent welding additive in the form of a gas-powder flow is added to the weld melt produced in the joint of the metal sheets to be welded via at least one flow duct, in such a way that the gas-powder flow leaving the flow duct is directed towards the weld melt and has an output speed of at least 2 m/s, in such a way the welding additive is mixed together turbulently with the weld melt, flow eddies forming in the weld melt during said mixing.

Introducing pulverulent welding additive of a suitable particle size makes diffuse mixing and alloying possible in the weld melt. Since the welding time is relatively short— especially in the case of laser welding, where the melt phase typically only lies in the range of approximately 6 ms to 125 ms—it is not possible to achieve sufficient mixing with the material (sheet metal) to be welded when using a welding additive in the form of a filler wire. Using a pulverulent welding additive having relatively small particles, preferably small metal particles, makes it possible to achieve largely homogeneous alloy mixing even in very short time periods of the melt phase, in particular in laser welding.

So as to achieve a homogeneous or virtually homogeneous weld seam microstructure without a negative effect from preferentially the zinc content, particularly preferably the aluminium content or aluminium-silicon content from the coating, the invention additionally provides turbulent mixing of the pulverulent welding additive with the weld melt, in such a way that flow eddies form in the weld melt. These flow eddies (turbulences) are predominantly brought about by the kinetics of the gas-powder flow, preferably the gas/metal powder flow. According to the invention, the output speed of the gas-powder stream directed towards the weld melt is at least 2 m/s; it is for example in the range of 2 m/s to 50 m/s, in particular between 2 m/s and 40 m/s, preferably between 2 m/s and 30 m/s. The flow eddies (turbulences) produced in the weld melt contribute to the possibility of complete or virtually complete mixing of the welding additive with the material alloy.

A preferred configuration of the method according to the invention is characterised in that the particles of the pulverulent welding additive have a particle size in the range of 20 µm to 160 µm, preferably in the range of 20 µm to 120 µm. If the particle sizes of the pulverulent welding additive are correspondingly fine, this promotes rapid and largely homogeneous alloy mixing.

A further advantageous configuration of the method according to the invention provides that the gas-powder flow leaving the flow duct is directed obliquely towards the weld melt, in such a way that the blast axis of the gas-powder flow is at an angle in the range of 15 degrees to 75 degrees, preferably in the range of 25 degrees to 65 degrees, to a workpiece plane defined by the metal sheets and comprising the weld melt. At the typical advance speeds of the welding head, this oblique positioning of the gas-powder flow with respect to the workpiece plane comprising the weld melt is favourable for producing the flow eddies in the weld melt and thus favourable for mixing the welding additive with the melted liquid workpiece material as rapidly and homogeneously as possible.

In a further preferred configuration of the method according to the invention, protective gas is used as the gas for producing the gas-powder flow. The protective gas prevents oxidation of the weld melt or protects the weld melt from oxidation, which would weaken the weld seam. The protective gas used as the gas for producing the gas-powder flow may for example be $CO_2$, argon, nitrogen, helium or a gas mixture consisting of argon, helium, nitrogen and/or $CO_2$.

Alternatively or in addition, a further preferred configuration of the method according to the invention provides that the metal sheets are weld-joined in a protective gas atmosphere.

The device according to the invention comprises at least one welding head for producing and/or focussing an energy beam for melt-welding sheet metal material, preferably a laser beam welding head, and at least one flow duct for supplying pulverulent welding additive in the form of a gas-powder flow to the weld melt of the metal sheets to be welded together, the flow duct comprising a duct portion which ends at a welding additive outlet opening and the longitudinal axis of which extends obliquely with respect to the beam axis of the energy beam, preferably the laser beam, leaving the welding head, the longitudinal axis of the duct portion and the beam axis of the energy beam enclosing an angle in the range of 15 degrees and 75 degrees, and the flow duct being provided with adjustment means (for example an adjustable gas flow throttle) which make it possible to set the gas powder flow to an output speed of at least 2 m/s.

The device according to the invention has the same advantages as the method according to the invention, and so reference is made to the statements above for the avoidance of repetition.

So as to achieve a sufficiently high flow speed (output speed) of the gas-powder flow to produce the desired flow eddies in the weld melt, a preferred configuration of the device according to the invention provides that the flow duct and/or the duct portion thereof ending at the welding additive output opening have a conical duct shape, the flow duct or the duct portion thereof tapering towards the outlet opening. The end duct portion may also have a cylindrical duct shape or a combination of a cylindrical and a conical duct shape.

A further advantageous configuration of the device according to the invention is characterised in that the flow duct and/or the duct portion thereof ending at the welding additive outlet opening have a cross-sectional shape other than a circular cross-sectional shape. As a result, the mixing of the welding additive with the workpiece alloy (melted liquid phase) can be further improved.

A further advantageous configuration of the device according to the invention provides that the flow duct and/or the duct portion thereof ending at the welding additive outlet opening have one or more constrictions towards the outlet opening. This configuration can also contribute to optimising the mixing of the welding additive with the workpiece alloy (melted liquid phase).

BREIF DESCRIPTION OF THE DRAWINGS

Figure 2:
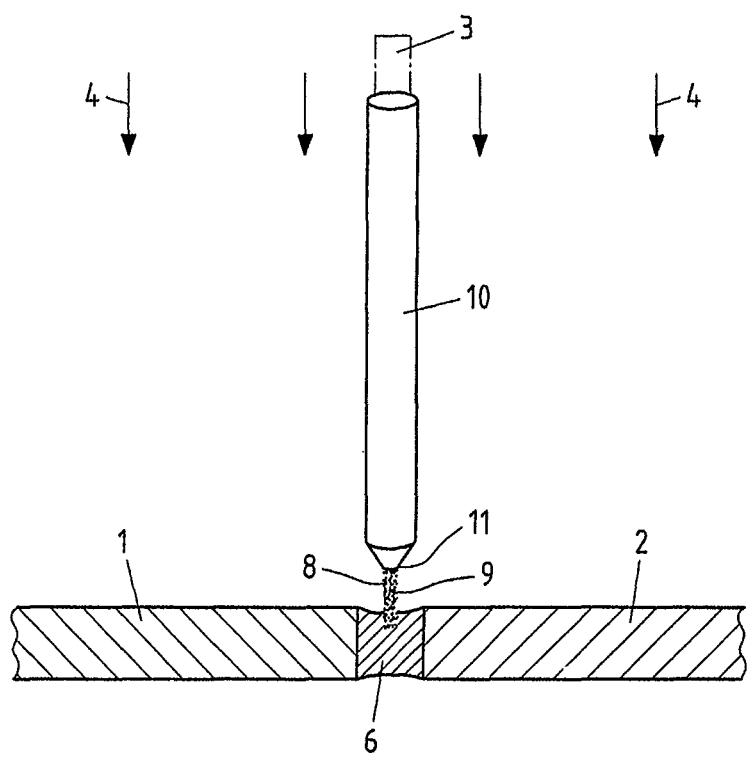
Figure 3:
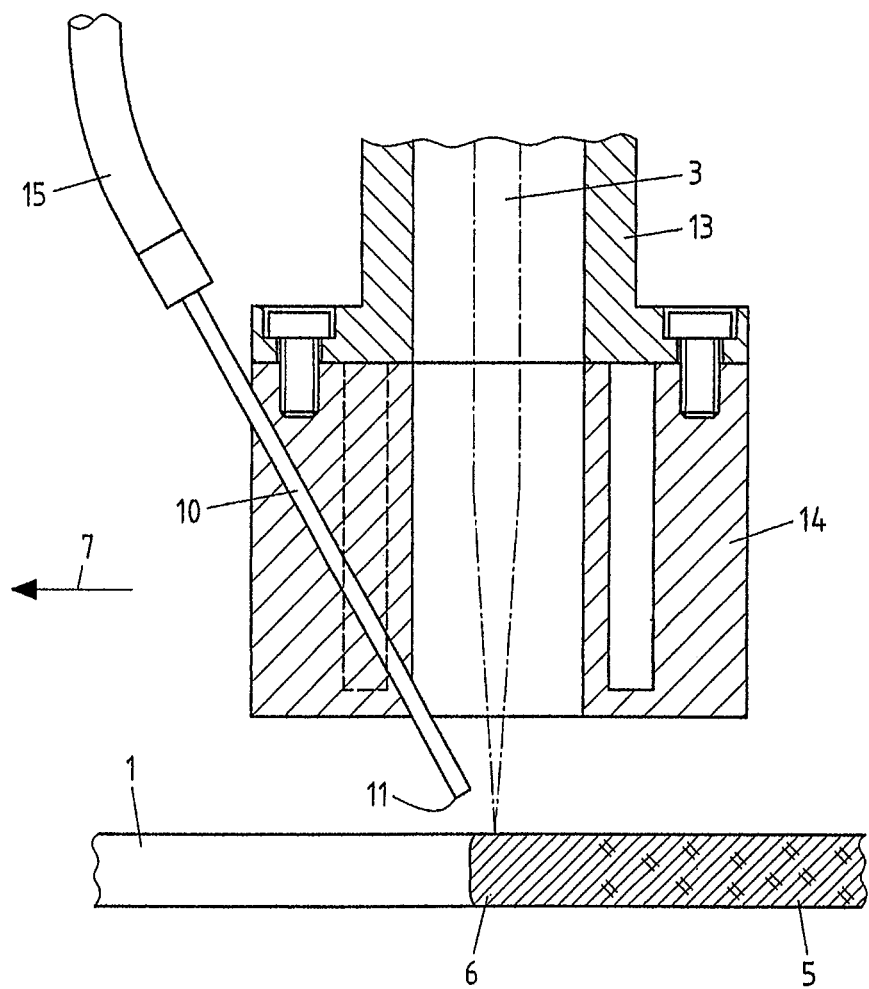

In the following, the invention is described in greater detail by way of drawings illustrating an embodiment, in which:

FIG. 1 schematically shows a laser beam welding process for joining together metal sheets coated with an aluminium alloy while supplying welding powder at a high flow speed, the weld seam being shown in longitudinal section;

FIG. 2 schematically shows the welding process according to FIG. 1, the metal sheets to be joined together in a butt joint and the weld melt being shown in cross-section; and FIG. 3 schematically shows a laser welding head comprising a flow duct for supplying pulverulent welding additive at a high flow speed.

DESCRIPTION OF THE INVENTION

FIGS. 1 and 2 schematically illustrate the principle behind the method according to the invention. Reference numerals 1 and 2 denote metal sheets to be welded together in a butt joint. At least one of the metal sheets or both metal sheets 1, 2 are coated with aluminium, preferably an Al-Si alloy. The metal sheets 1, 2 are plates or strips, preferably of steel, in particular boron-manganese steel. The metal sheets 1, 2 may differ in the sheet thickness and/or material quality thereof.

The metal sheets 1, 2 are preferably welded together by means of at least one laser beam 3. Alternatively, however, according to the invention the metal sheets 1, 2 may also be welded together by means of another suitable welding device, for example by means of a plasma beam welding device or an arc welding device.

The joint-welding of the metal sheets 1, 2 is preferably carried out in a protective gas atmosphere. The protective gas atmosphere is indicated in FIGS. 1 and 2 by four arrows 4 arranged mutually parallel.

The metal sheets 1, 2 to be joined together are fused along the joint thereof, in such a way that the fused material can be intermixed and forms a weld seam 5 after solidifying. The weld melt (melted liquid phase) of the metal sheets 1, 2 is marked in FIGS. 1 and 2 by finer hashing and the reference numeral 6. The solidified weld melt, i.e. the weld seam 5, is marked in FIG. 1 by additional transverse lines.

The advance direction of the welding head of a device according to the invention is indicated in FIG. 1 by the arrow 7.

According to the invention, at least one pulverulent welding additive 8 is introduced into the weld melt 6. The welding additive 8 is added to the weld melt 6 via at least one flow duct (nozzle duct) 10 in the form of a gas-powder flow 9. The welding additive 8 is formed from welding powder or metal powder. The metal powder preferably substantially corresponds in composition to the workpiece alloy of at least one of the metal sheets 1, 2 to be welded. Alternatively or in addition, the pulverulent welding additive 8 may also contain strength-increasing constituents or consist exclusively thereof. The particles of the welding additive 8 have a size in the range of 20 µm to 160 µm, preferably in the range of 20 µm to 120 µm.

The gas-powder flow 9 which leaves the flow duct 10 while the welding head advances is directed towards the weld melt 6. In this context the duct portion, ending at the outlet opening 11, of the flow duct 10 is arranged ahead of the welding energy beam or laser beam 3 in the advance direction of the welding head.

The output speed of the gas-powder flow 9 is at least 2 m/s, in such a way that the weld melt 6 is mixed together turbulently with the welding additive 8, flow eddies 12 forming in the weld melt 6 during said mixing (cf. FIG. 1). The output speed of the gas-powder flow 9 is preferably in a range of 2 m/s to 30 m/s.

The gas of the gas-powder flow 9 is preferably protective gas, for example argon, $CO_2$, nitrogen, helium or a gas mixture consisting of argon, helium, nitrogen and/or $CO_2$.

The welding energy beam or laser beam 3 incident on the workpiece, i.e. on the metal sheets 1, 2, is orientated in a perpendicular or virtually perpendicular position with respect to the workpiece 1, 2. By contrast, the gas-powder flow 9 leaving the flow duct 10 is directed obliquely towards the weld melt 6, in such a way that the blast axis of the gas-powder flow 9 is at an angle a in the range of 15 degrees to 75 degrees to a workpiece plane defined by the metal sheets 1, 2 and comprising the weld melt 6.

The high flow speed of the gas-powder mixture 9 is achieved by a special configuration of the flow duct 10. The high flow speed of the gas-powder mixture 9 involves a significant amount of kinetic energy, which is converted into flow eddies 12 in the weld melt 6. These eddies 12 make possible homogeneous or virtually homogeneous mixing of the pulverulent welding additive 8 with the workpiece alloy, and prevent needle-shaped formation of Fe-Al eutectics, which have only relatively low strengths.

FIG. 3 schematically illustrates the lower portion of a laser welding head 13. The laser welding head 13 contains a lens system (not shown) by means of which a laser beam 3 can be focussed and the laser beam focus can be directed towards the joint of metal sheets to be welded together.

In the embodiment sketched in FIG. 3, a substantially cylindrical hollow body 14 is mounted on the welding head 13, and is provided with a tubular flow duct (nozzle duct) 10, via which the aforementioned pulverulent welding additive 8 can be supplied to the working location of the laser beam 3 and thus to the weld melt 6 at a high flow speed. The flow duct (nozzle duct) 10 extends obliquely with respect to the central longitudinal axis of the hollow body 14 or with respect to the laser beam axis. The internal diameter of the nozzle duct 10 is for example between 0.6 mm and 1.2 mm. A conveying hose 15, via which the pulverulent welding additive is supplied to the nozzle duct 10, is connected to the end of the flow duct 10 opposite the outlet opening 11.

The flow duct (nozzle duct) 10 is preferably conical in form and tapers towards the outlet opening 11 thereof assigned to the weld melt 6. Alternatively or in addition, the flow duct 10 may also comprise one or more constrictions towards the outlet opening 11. In this context, the open cross-sectional shape of the flow duct 10 may be circular in form in each case or have a cross-sectional shape other than a circular cross-sectional shape.

The configuration of the invention is not limited to the embodiment sketched in FIG. 3 of a laser welding head of a laser welding device according to the invention. Rather, a plurality of variants are conceivable which also make use of the invention specified in the claims in a configuration other than the sketched embodiment.

The invention claimed is:

1. A method for joint-welding coated metal sheets in a butt joint, comprising the steps of adding at least one pulverulent welding additive in the form of a gas-powder flow to the weld melt via at least one flow duct, in such a way that the gas-powder flow leaving the flow duct is directed towards the weld melt and has an output speed of at least 2 m/s, in such a way the welding additive is mixed together turbulently with the weld melt, flow eddies forming in the weld melt during said mixing.

2. The method according to claim 1, wherein the metal sheets are welded together by means of at least one laser beam.

3. The method according to claim 1, wherein the welding additive is formed from a metal powder.

4. The method according to claim 1, wherein the particles of the pulverulent welding additive have a particle size in the range of 20 µm to 160 µm.

5. The method according to claim 1, wherein the gas-powder flow is adjusted in such a way that the output speed thereof from the flow duct is in the range of 2 m/s to 50 m/s.

6. The method according to claim 1, wherein the gas-powder flow leaving the flow duct is directed obliquely onto the weld melt, in such a way that the blast axis of the gas-powder flow is at an angle in the range of 15 degrees to 75 degrees to a workpiece plane defined by the metal sheets and comprising the weld melt.

7. The method according to claim 1, wherein protective gas is used as the gas for producing the gas-powder flow.

8. The method according to claim 1, wherein the joint-welding of the metal sheets is carried out in a protective gas atmosphere.

9. The method according to claim 1, wherein at least one of the metal sheets to be welded together is a sheet of steel, preferably boron-manganese steel, which is coated with aluminium, preferably an Al—Si alloy.

* * * * *